Patented Jan. 26, 1937

2,069,167

UNITED STATES PATENT OFFICE 2,069,167

1,2-ALIPHATIC-DIAMINE THIOSULPHATES AND PROCESS OF PREPARING THEM

Morris S. Kharasch, Chicago, Ill., assignor to Eli Lilly and Company, Indianapolis, Ind., a corporation of Indiana No Drawing. Original application June 23, 1934, Serial No. 732,088. Divided and this application April 22, 1936, Serial No. 75,751

6 Claims. (Cl. 260—127)

It is the object of my invention to produce the stable compounds 1,2-aliphatic-diamine thiosulphates.

This present application is a division of my co-pending application Serial No. 732,088, filed June 23, 1934.

The 1,2-aliphatic-diamine thiosulphates, to which this present application is directed, are of special value in connection with the stabilization of water solutions of water-soluble mercurials, as set forth in said co-pending parent application.

These 1,2-aliphatic-diamine thiosulphates may be prepared from the corresponding 1,2-aliphatic-diamine sulphites, as from 1,2-ethylenediamine sulphite or 1,2-propylene-diamine sulphite, by additionally sulphurizing the sulphite.

This is conveniently done by heating the chosen 1,2-aliphatic-diamine sulphite with sulphur, in boiling water, for one to two hours; then concentrating to a small volume (or to dryness) by evaporation of the water (desirably under vacuum); and then adding acetone, which precipitates the 1,2-aliphatic-diamine thiosulphate. This is collected on a filter, and may be crystallized from a small amount of water or alcohol-water mixture. On cooling it separates from that solvent-mixture, in the form of beautiful white crystals.

1,2-ethylenediamine thiosulphate melts at 218° C., with decomposition. An analysis of it for nitrogen and for sulphur indicates that its formula is:

(1)     $(S_2O_3H)-NH_3-CH_2-CH_2-NH_2$ 1,2-propylenediamine thiosulphate melts at 186° C., with decomposition. An analysis of it for nitrogen and for sulphur indicates that its formula is:

(2) 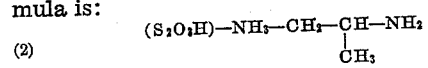

The 1,2-aliphatic-diamine sulphites which are used for preparing the corresponding thiosulphates are also new with me, but have been described in my co-pending application Serial No. 725,483, filed May 14, 1934.

These aliphatic-diamine sulphites may be prepared in various ways. Perhaps the most convenient way is by causing the corresponding 1,2-aliphatic-diamine to react with sulphur dioxide or sulphurous acid; conveniently by passing sulphur dioxide into either an absolute or aqueous alcohol solution of the desired 1,2-aliphatic-diamine (such as 1,2-ethylenediamine or 1,2-propylenediamine) or into an acetone solution of such diamine; upon which the corresponding 1,2-aliphatic-diamine sulphite separates in solid form.

I claim as my invention:
1. A 1,2-aliphatic-diamine-thiosulphate.
2. 1,2-ethylenediamine thiosulphate.
3. 1,2-propylenediamine thiosulphate.
4. The process of producing a 1,2-aliphatic-diamine thiosulphate, which consists in boiling the corresponding 1,2-aliphatic-diamine sulphite with sulphur in water.
5. The process of producing 1,2-ethylenediamine thiosulphate, which consists in boiling 1,2-ethylenediamine sulphite with sulphur in water.
6. The process of producing 1,2-propylene-diamine thiosulphate, which consists in boiling 1,2-propylenediamine sulphite with sulphur in water.

MORRIS S. KHARASCH.